(12) United States Patent
Suto

(10) Patent No.: US 10,192,438 B2
(45) Date of Patent: Jan. 29, 2019

(54) ELECTRONIC APPARATUS, GUIDE METHOD, AND GUIDE SYSTEM

(71) Applicant: Alpine Electronics, Inc., Shinagawa-ku, Tokyo (JP)

(72) Inventor: Shuichi Suto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 21 days.

(21) Appl. No.: 15/474,774

(22) Filed: Mar. 30, 2017

(65) Prior Publication Data

US 2017/0323566 A1    Nov. 9, 2017

(30) Foreign Application Priority Data

May 9, 2016    (JP) .................. 2016-093842

(51) Int. Cl.
*G01C 21/26*    (2006.01)
*G01S 19/39*    (2010.01)
*G01S 19/51*    (2010.01)
*G08G 1/0968*    (2006.01)

(52) U.S. Cl.
CPC ..... *G08G 1/096861* (2013.01); *G01C 21/265* (2013.01); *G01S 19/39* (2013.01); *G01S 19/51* (2013.01)

(58) Field of Classification Search
CPC ....... G08G 1/096861; G08G 1/096816; G08G 1/096822; G01S 19/39; G01S 19/51; G01C 21/265; G01C 21/3658
See application file for complete search history.

(56) References Cited

U.S. PATENT DOCUMENTS

| | | | | |
|---|---|---|---|---|
| 2009/0138193 A1* | 5/2009 | Katou | ................ | G01C 21/3658 701/533 |
| 2009/0222202 A1* | 9/2009 | Kato | .................. | G01C 21/3655 701/414 |
| 2012/0123672 A1* | 5/2012 | Kojima | .............. | G01C 21/3658 701/410 |
| 2014/0350845 A1* | 11/2014 | Hayashi | ............. | G01C 21/3438 701/428 |
| 2015/0185026 A1* | 7/2015 | Hightower | ......... | G01C 21/3658 701/533 |

(Continued)

FOREIGN PATENT DOCUMENTS

| | | |
|---|---|---|
| JP | 2004-185504 | 7/2004 |
| JP | 2006-236247 | 9/2006 |

(Continued)

*Primary Examiner* — Michael J Zanelli
(74) *Attorney, Agent, or Firm* — Brinks Gilson & Lione

(57) ABSTRACT

Lane travel limit zones (between a lane route deviation point and a first lane change limit point and between the lane route deviation point and a second lane change limit point), in which a lane change to a route is prohibited, are set according to the lane. If a vehicle may enter a set lane travel limit zone, a guide is provided to prompt the vehicle to make a lane change or maintain the traveling lane, according to the vehicle position and the lane on which the vehicle is traveling. To set lane travel limit zones, the lane route deviation point, which is an end point of a lane on which the vehicle can travel, the first and second lane route deviation points, which are limit points to assure that the vehicle completes a lane change before reaching the lane route deviation point, are calculated.

13 Claims, 14 Drawing Sheets

(56) References Cited

U.S. PATENT DOCUMENTS

2017/0018189 A1* 1/2017 Ishikawa ............... G05D 1/0214
2017/0320521 A1* 11/2017 Fujita ...................... B62D 6/00
2018/0217604 A1* 8/2018 Nakajima .......... G01C 21/3655

FOREIGN PATENT DOCUMENTS

| | | | |
|---|---|---|---|
| JP | 2007-127598 | | 5/2007 |
| JP | 2013-19803 | * | 1/2013 |
| JP | 2017-32440 | * | 2/2017 |

* cited by examiner

WHEN LANE CHANGE IS NEEDED

EXAMPLE OF GUIDE: MOVE TO A LEFT LANE

WHEN OVERTAKING IS ATTEMPTED

EXAMPLE OF GUIDE: MAINTAIN THE CURRENT LANE

WHEN LANE CHANGE IS NEEDED

EXAMPLE OF GUIDE: MOVE TO A RIGHT LANE

WHEN LINE CHANGE IS ATTEMPTED

EXAMPLE OF GUIDE: MAINTAIN THE CURRENT LANE

ELECTRONIC APPARATUS, GUIDE METHOD, AND GUIDE SYSTEM

RELATED APPLICATIONS

The present application claims priority to Japanese Patent Appln. No. 2016-093842, filed May 9, 2016, the entire disclosure of which is hereby incorporated by reference.

BACKGROUND

1. Field of the Disclosure

The present disclosure relates to a lane guide provided by an electronic apparatus having a driving assisting function, and more particularly to a traveling guide provided when there is a branch or lane restriction ahead.

2. Description of the Related Art

Some vehicle-mounted apparatuses having a navigation function or a driving assisting function that use a map database to provide a guide for a route to a set destination and a guide for a lane restriction present ahead. These guides are implemented by, for example, a voice or a display. These guides allow the driver to safely reach a destination without losing their way.

Route guides are often provided at timings at which a right-turn, a left-turn, or a lane change will be involved due to, for example, a traffic intersection, a branch point, a reduction in the number of lanes, or a lane restriction. When, for example, there is a traffic intersection or a branch point, the number of lanes the vehicle can enter is displayed and, of these, the positions of lanes the vehicle can enter in the travel direction are clarified, or the position of a lane the vehicle can enter in the travel direction is indicated by, for example, providing a guide such as "Move to a right lane" short of the traffic intersection or branch point.

There are various technologies concerning a timing at which to provide a road guide. Japanese Unexamined Patent Application Publication No. 2004-185504 discloses a driving assisting apparatus that, when providing a guide, decides whether there is another vehicle on a lane to which to make a lane change, and issues a lane change command according to a decision result. Japanese Unexamined Patent Application Publication No. 2007-127598 discloses a lane change guide apparatus that compares the travel direction in which the vehicle intends to travel with lane information about the lane on which the vehicle is currently traveling, determines whether a lane change is necessary in consideration of a lane change prohibited zone short of a traffic intersection, and provides a guide for a lane change from the traveling lane according to a decision result. Japanese Unexamined Patent Application Publication No. 2006-236247 discloses a restricted-lane detecting apparatus and a vehicle-oriented route recommending apparatus that acquires travel information about a vehicle that traveled in a zone on which a lane restriction is imposed, detects a restricted lane on which a traffic restriction is imposed according to the travel information, and if the lane on which the vehicle will travel matches the restricted lane, recommends a lane change.

SUMMARY

Some conventional vehicle-mounted apparatuses provide a guide regardless of whether a lane change is necessary. If this guide is not useful for the driver, there has been the risk that the guide becomes burdensome to the driver or the driver fails to hear an important guide. In a road network in which branches are present in succession like expressways in a capital or a large city, it is difficult to travel correctly in spite of lane guides being present.

A solution to these problems is a method by which a guide is provided only when the travel direction does not match the direction of the traveling lane a guided traffic intersection and no guide is provided in other cases. For example, if the vehicle M is already traveling in the direction of the guided route (left lane) as illustrated in FIG. 18A, no guide is provided; only when the vehicle M is traveling on the right lane and needs to make a lane change as illustrated in FIG. 18B, a guide is provided to draw the driver's attention.

This method solves the problem that the guide becomes burdensome to the driver, but cannot cope with a case in which the travel direction matches the direction of the traveling lane but a lane guide is needed because, for example, the number of lanes is reduced or a lane restriction is imposed.

The present disclosure addresses these conventional problems with an object of providing an electronic apparatus, a guide method, and a guide system that, even if the travel direction matches the direction of the traveling lane on a road on which the number of lanes is reduced or a lane restriction is imposed, can provide a lane guide using the same logic as used in a case in which the travel direction does not match the direction of the traveling lane at a branch point, a traffic intersection, or the like.

An electronic apparatus according to one form of the present disclosure has a setting means that can set, for each lane, a lane travel limit zone in which a lane change to a route is restricted, a calculating means for calculating the position of the vehicle, a detecting means for detecting a traveling lane on which the vehicle is traveling, and a guide means for providing a guide concerning the traveling lane detected by the detecting means according to the traveling lane and the position of the vehicle, the position having been calculated by the calculating means, before the vehicle enters the lane travel limit zone.

The setting means preferably sets a zone between a deviation point from which a deviation from the route occurs and a limit point up to which a lane change to the route is possible, the limit point being short of the deviation point, as the lane travel limit zone. In some implementations, the deviation point is an end of a lane change prohibited zone on a road having a branch, the deviation point is an end of a restricted lane zone, and/or the deviation point is an end of a lane to be eliminated in a lane reduction portion.

In some implementations, when the vehicle is traveling on a road having a plurality of lanes, the setting means sets one lane travel limit zone for each lane. The setting means sets a first lane travel limit zone on a first lane close to a lane on which the vehicle is allowed to travel in a route direction without making a lane change, and also sets a second lane travel limit zone, which is longer than the first lane travel limit zone, on a second lane, which is further away from the lane on which the vehicle is allowed to travel in the route direction without making a lane change than the first lane. The guiding means provides a guide that prompts a lane change to the route if the vehicle may enter a lane travel limit zone on another lane from a point short of a lane travel limit zone on the traveling lane. The electronic apparatus further includes a deciding means that decides whether the vehicle is going to make a lane change. If the deciding means decides that the vehicle is going to make a lane change from an intermediate point in a lane travel limit zone on the traveling lane to a lane travel limit zone on another lane, the guiding means provides a guide that prompts the vehicle to maintain the traveling lane.

In some implementations, the deciding means has a white line detecting means for detecting a while line on a road surface. When the vehicle approaches or has exceeded a white line, the deciding means decides that the vehicle has made a lane change. The electronic apparatus preferably further includes a guided route calculating means for calculating a guided route to a destination. The route is a guided route calculated by the guided route calculating means.

In another form of the present disclosure, an electronic apparatus has a communication means for communicating with a server apparatus, a receiving means for receiving, from the server apparatus, a route to a destination and a lane travel limit zone that is set for each lane and in which a lane change to the route is restricted, a calculating means for calculating the position of the vehicle, a detecting means for detecting a traveling lane on which the vehicle is traveling, and a guide means for providing a guide concerning the traveling lane according to the position of the vehicle and the traveling lane before the vehicle enters the lane travel limit zone.

A guide method according to forms of the present disclosure is executed in an electronic apparatus that has a control means. The guide method has a setting step of being able to set a lane travel limit zone, in which a lane change to a route must not be started, for each lane, a vehicle position calculating step of calculating the position of the vehicle, a detecting step of detecting a traveling lane on which the vehicle is traveling, and a guiding step of providing a guide concerning the traveling lane according to the calculated position of the vehicle and the detected traveling lane before the vehicle enters the lane travel limit zone.

A guide system according to forms of the present disclosure has an electronic apparatus and a server apparatus. The server apparatus has a sever-side receiving means for receiving the position of the vehicle and a destination from the electronic apparatus, a route calculating means for calculating a route according to the position of the vehicle and the destination, a setting means of being able to set a lane travel limit zone, in which a lane change to the route is restricted, for each lane, and a transmitting means for transmitting the route and the lane travel limit zone to the electronic apparatus. The electronic apparatus has a position calculating means for calculating the position of the vehicle, a detecting means for detecting a traveling lane on which the vehicle is traveling, a vehicle-side receiving means for receiving the route and the lane travel limit zone from the server apparatus, and a guiding means for providing a guide concerning the traveling lane according to the position of the vehicle and the traveling lane before the vehicle enters the lane travel limit zone.

An electronic apparatus in other guide systems according to the present disclosure has a communication means for communicating with a server apparatus, a receiving means for receiving, from the server apparatus, a route to a destination and a lane travel limit zone that is set for each lane and in which a lane change to the route is restricted, a calculating means for calculating the position of the vehicle, a detecting means for detecting a traveling lane on which the vehicle is traveling, and a guide means for providing a guide concerning the traveling lane according to the position of the vehicle and the traveling lane before the vehicle enters the lane travel limit zone.

In implementations of the present disclosure, since a lane travel limit zone is settable for each lane, even if the travel direction matches the direction of the traveling lane on a road on which the number of lanes is reduced or a lane restriction is imposed, it is possible to provide a lane guide by using the same logic as used in a case in which the travel direction does not match the direction of the traveling lane at a branch point, a traffic intersection, or the like.

DETAILED DESCRIPTION OF THE DRAWINGS

Embodiments and forms of the present disclosure will be described in detail with reference to the drawings. An electronic apparatus in one form of the present disclosure can be a vehicle-mounted apparatus that is fixedly mounted on a moving body such as an automobile. Electronic apparatuses in the present disclosure may include a navigation function, a driving assisting function, and the like, but may include other functions such as, for example, a function to reproduce audio and video data, a function to receive television and radio broadcasts, and a function to execute application software in an integrated manner. Furthermore, electronic apparatuses in the present disclosure may accumulate, in a storage device, road map data used by the electronic apparatus itself to execute the navigation function. Alternatively, electronic apparatuses in the present disclosure may acquire necessary road map data from a distribution site or distribution server on the Internet through a data communication means that is, for example, wireless.

EMBODIMENTS

Figure 1:
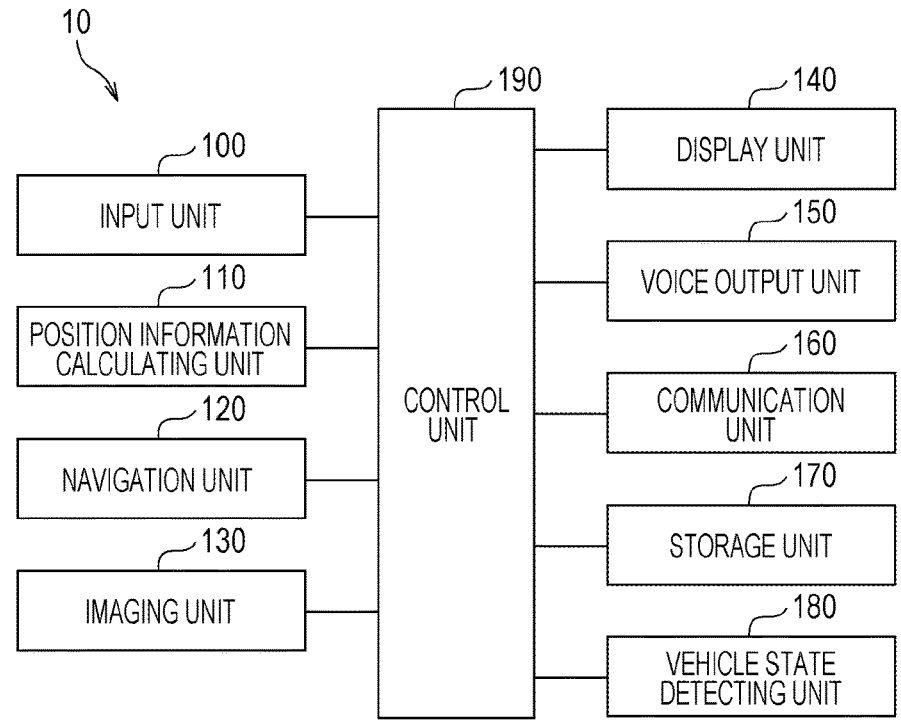
FIG. 1 is a block diagram illustrating the structure of a vehicle-mounted apparatus in a first embodiment of the present invention.

FIG. 1 is a block diagram illustrating the structure of a vehicle-mounted apparatus in a first embodiment of the present invention. The vehicle-mounted apparatus 10 includes, for example, an input unit 100, a position information calculating unit 110, a navigation unit 120, an imaging unit 130, a display unit 140, a voice output unit 150, a communication unit 160, a storage unit 170, a vehicle state detecting unit 180, and a control unit 190.

The input unit 100 accepts a command from the user through an input key device, a voice input recognition apparatus, a touch panel, or the like, and outputs the accepted command to the control unit 190. The position information calculating unit 110 calculates the current position of the vehicle from a Global Positioning System (GPS) signal transmitted from a GPS satellite or an output from a relative bearing sensor such as a gyroscope sensor or an absolute bearing sensor such as a geomagnetic sensor.

The navigation unit 120 calculates, for example, a guided route from the current position calculated by the position information calculating unit 110 to the destination, outputs a voice guide for the calculated guided route from the voice output unit 150, and displays a road map around the position of the vehicle on the display unit 140. The destination used in the navigation unit 120 is input by, for example, the user from the input unit 100. The guided route calculated by the navigation unit 120 is stored in the storage unit 170 formed from various memories.

The imaging unit 130 includes cameras that photograph the inside and outside of the vehicle. A camera that photographs the outside of the vehicle has an imaging range in which at least a white line on the road is photographed. An image taken by the imaging unit 130 is output to the control unit 190. This image is used to detect a lane on which the vehicle is traveling and decide whether the vehicle is going to make a lane change. The display unit 140 includes a display device such as a liquid crystal display or an organic electroluminescent (EL) display. For example, the display unit 140 displays an image of a road map created by the navigation unit 120 and also displays a menu screen and a setting screen on which user settings are made. The voice output unit 150 outputs a voice guide for a route calculated by the navigation unit 120 and also outputs a voice guide that provides the driver with driving support information.

Figure 2:
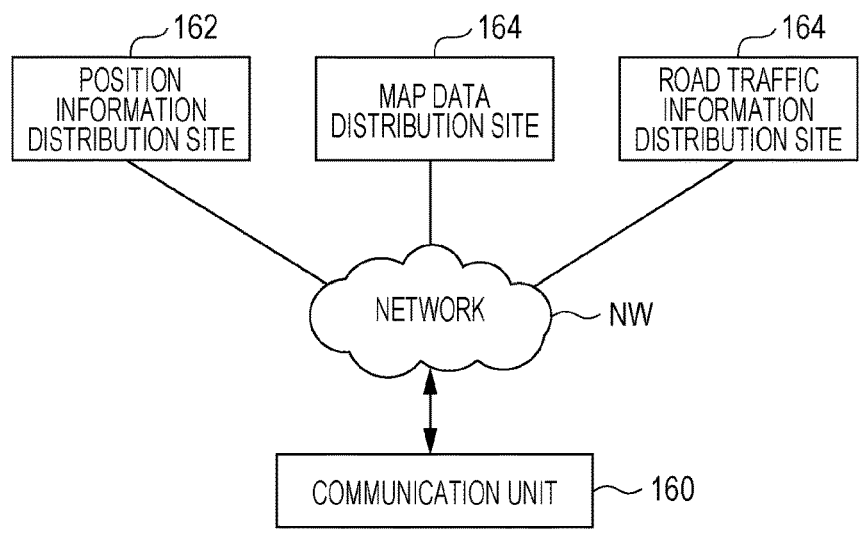
FIG. 2 illustrates an example in which information is acquired from distribution sites.

The communication unit 160 enables data to be transmitted and received among various external apparatuses. The communication unit 160 may be implemented as a communication function incorporated in the vehicle-mounted apparatus 10 itself or by connecting a terminal having a communication function to the vehicle-mounted apparatus 10. For example, as illustrated in FIG. 2, the communication unit 160 can access a position information distribution site 162 through a network (NW) and can acquire vehicle position information from the position information distribution site 162. The communication unit 160 can also access a map data distribution site 164 and can acquire necessary map data from the map data distribution site 164. The communication unit 160 can also access a road traffic information distribution site 166 and can acquire detailed information about road traffic information from there. Vehicle position information acquired from the position information distribution site 162 can be used as an alternative to vehicle position information calculated by the position information calculating unit 110.

Figures 3A, 3B:
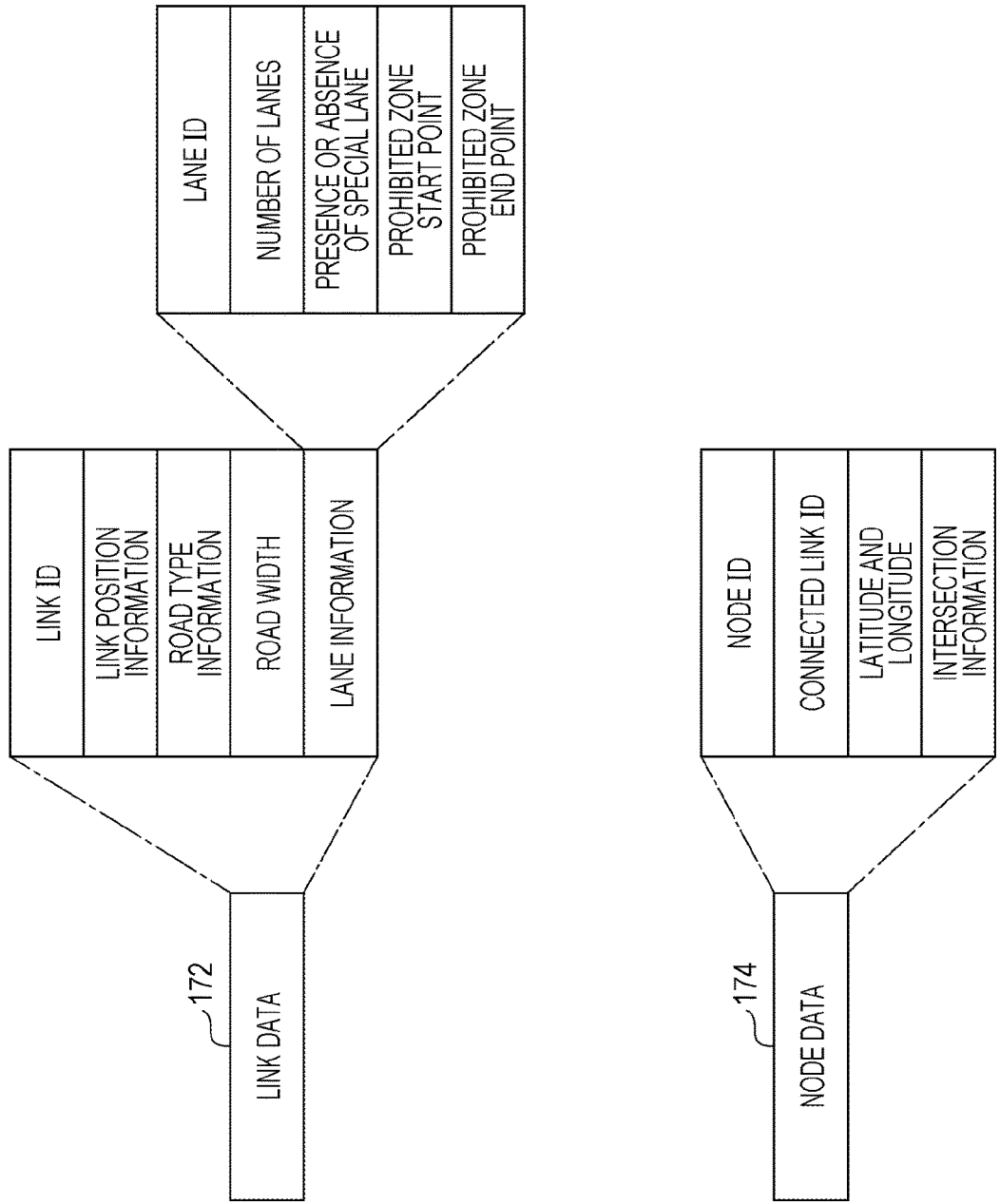
FIGS. 3A and 3B illustrate example map data in the first embodiment.

The storage unit 170 can store application software and programs executed by the control unit 190, map data needed by the navigation unit 120, and the like. Map data can include node data indicating traffic intersections and the like as well as link data indicating inter-node roads. FIGS. 3A and 3B illustrate example map data in the first embodiment. Link data 172 includes at least a link ID, link position information, road type information, a road width, and lane information. A link ID is information used to identify a link. Link position information includes the coordinates of the start point and end point of the link. Road type information classifies a road as an ordinary road, a high-speed road, a toll road, or the like. A road width indicates the road width of the link. Lane information includes a lane ID that identifies a lane and attribute information about the lane. Attribute information about the lane includes the number of lanes, information that identifies whether the lane is a straight-only lane, a right-turn-only lane, a left-turn-only lane, or the like, a lane width, and the coordinates of a prohibited zone start point and a prohibited zone end point of a prohibited zone, which indicate a zone on which a lane change must not be made. Node data 174 includes at least a node ID, a connected link ID, a latitude, a longitude, intersection information, and other information. A node ID is an ID that uniquely identifies a piece of node information. A connected link ID indicates the link ID of a link to be connected to the node. A latitude and longitude are two-dimensional coordinate information indicating the position of the node. Intersection information is information that indicates a traffic intersection.

The vehicle state detecting unit 180 acquires information about various states of the vehicle. For example, the vehicle state detecting unit 180 can acquire a vehicle speed pulse, which indicates information about the speed of the vehicle, direction indicator information, gear information, steering wheel angle information, and other information.

The control unit 190 controls units in the vehicle-mounted apparatus 10. In a preferred aspect, the control unit 190 is composed of a microcontroller, which includes a read-only memory (ROM), a random-access memory (RAM), and the like, and other components; the ROM or RAM can store programs that control units. In this embodiment, the control unit 190 executes a guide program 200 that provides guides for the driver by, for example, alerting the driver when a lane change is to be made.

Figure 4:
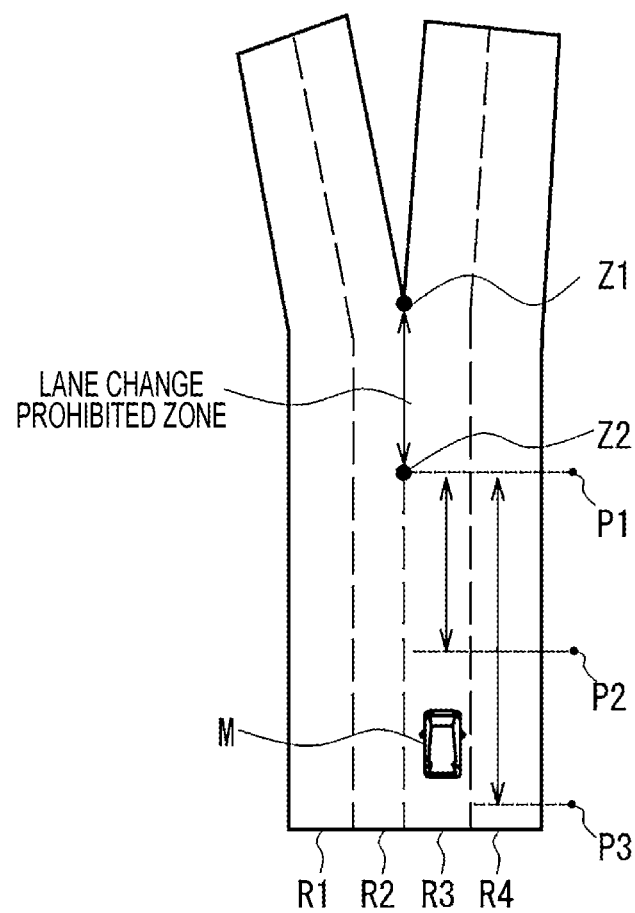
FIG. 4 defines points and zones on a road having a branch in the first embodiment.

FIG. 4 defines points and zones on a road having a branch in the first embodiment. As an example, a road includes lanes R1, R2, R3, and R4 (these lanes may be collectively referred to below as the road R); the lanes R1 and R2 (left branch lanes) branch to the left from the lanes R3 and R4 (right branch lanes) at an intermediate point on the road. In this implementations, a prohibited zone start point included in lane attribute information is denoted Z1, and a prohibited zone end point is denoted Z2. A zone defined by linking Z1 and Z2 is a lane change prohibited zone. That is, while the vehicle M is traveling on the lane R3, the vehicle M must not change the lane R3 from the lane change prohibited zone to the lane R1 or R2. The coordinates of the prohibited zone start point Z1 may be the same as the coordinates of the latitude and longitude in the node data of the branch point.

Figure 5:
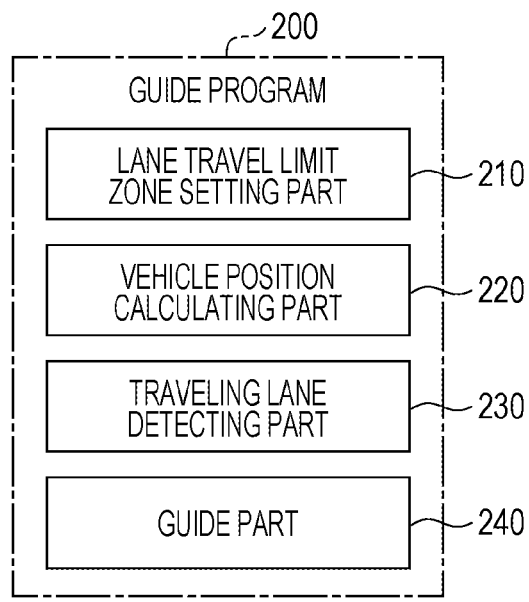
FIG. 5 illustrates an example of the functional structure of a guide program in the first embodiment.

FIG. 5 illustrates an example of the functional structure of the guide program 200 in this embodiment. The guide program 200 includes a lane travel limit zone setting part 210, a vehicle position calculating part 220, a traveling lane detecting part 230, and a guide part 240.

The lane travel limit zone setting part 210 enables a lane travel limit zone to be set for each lane according to the speed information about the vehicle M and the like. The lane travel limit zone is a zone in which a lane change must not be started to a route depending on a certain road environment and a traveling situation. The route is not necessarily limited to a route, searched for by the navigation unit 120, to the destination. The main road on which the vehicle M is currently travelling may be handled as a virtual route. The lane travel limit zone will be described with reference to FIG. 4. The route in this example will be assumed to branch from one of the lane R3 and R4, which are main lanes, to the left, that is, to the lane R1 or R2. Since a lane must not be changed from the lane change prohibited zone, if, for example, the vehicle M is travelling on the lane R3 at a constant speed, the vehicle M needs to make a lane change at a position a certain distance short of the prohibited zone end point Z2 in consideration of a time required to make a lane change. Therefore, a guide for a lane change needs to be provided at a position short of the above position. In view of this, the lane travel limit zone is set in front of the prohibited zone end point Z2.

Figure 6:
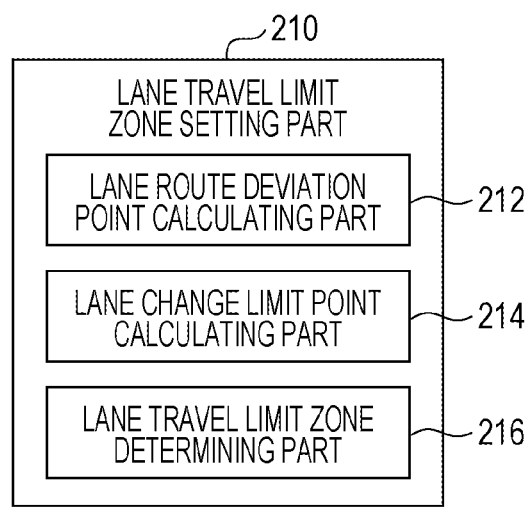
FIG. 6 illustrates the functional structure of a lane travel limit zone setting part in the first embodiment.

Next, the lane travel limit zone setting part 210 will be described in detail. FIG. 6 is a block diagram illustrating the functional structure of the lane travel limit zone setting part 210. The lane travel limit zone setting part 210 includes a lane route deviation point calculating part 212, a lane change limit point calculating part 214, and a lane travel limit zone determining part 216. As a lane route deviation point, the lane route deviation point calculating part 212 calculates an end point of a lane on which the vehicle M is allowed to travel. In the example in FIG. 4, a point P1, which is aligned to the prohibited zone end point Z2 of the lane change prohibited zone, is calculated as the lane route deviation point. This is because if the vehicle M has passed the lane route deviation point P1, the vehicle M is in the lane change prohibited zone, so the vehicle M must not change to the lane R1 or R2.

The lane change limit point calculating part 214 calculates a limit point used to prompt the vehicle M to complete a lane change at a point short of the lane route deviation point calculated by the lane route deviation point calculating part 212 as a lane change limit point, according the speed information about the vehicle M and other information. Specifically, in the example in FIG. 4, while the vehicle M is traveling on the lane R3, the lane change limit point is a point P2; while the vehicle M is traveling on the lane R4, the lane change limit point is a point P3. If the vehicle M starts a lane change before the vehicle M reaches the lane change limit point P2 or P3, the vehicle M can smoothly make a lane change without passing the lane change prohibited zone.

Next, a method of calculating the lane change limit point will be described. The lane change limit point varies depending on the traveling speed of the vehicle M, the lane on which the vehicle M is traveling, and the route (travel direction), and the like. The greater the traveling speed, the more the lane change limit point deviates from the lane route deviation point. Therefore, the lane change limit point calculating part 214 calculates the lane change limit point for each lane according to vehicle speed information, a direction indicator blinking time, vehicle position information, a time required to make a lane change (inferred from a vehicle speed, a steering wheel angle, and a road shape), and other information. Information required to calculate the lane change limit point is acquired from the vehicle state detecting unit 180. Alternatively, information stored in the storage unit 170 in advance is used.

An example to calculate the lane change limit point will be described below. First, a vehicle speed pulse is acquired and a time required to make a lane change is calculated. It will be assumed here that the vehicle speed is 40 km/h and a time required to change the current lane to an adjacent lane is 5 seconds. Then, since the vehicle M advances about 11 meters per second, it is necessary to assure at least 55 meters as a distance required to make a lane change. Therefore, a point 55 meters short of the lane route deviation point can be calculated as the lane change limit point. In FIG. 4, the point P2 is the lane change limit point in a case in which the vehicle M makes a lane change from the lane R3 in the left branching direction, and the point P3 is the lane change limit point in a case in which the vehicle M makes a lane change from the lane R4 in the left branching direction. When the vehicle M makes a lane change from the lane R4 in the left branching direction, the vehicle M needs to make two lane changes, so a point more distant from the lane route deviation point than the lane change limit point on the lane R3 is calculated as the lane change limit point on the lane R4.

Although there is no particular limitation on the method of calculating the lane change limit point on the lane R4, it may be calculated from a vehicle speed pulse and a time required to make a lane change as in the case of the lane R3. Alternatively, the lane change limit point on the lane R4 may be obtained by multiplying the lane change limit point calculated for the lane R3 by a certain coefficient. For example, since two lane changes are made, the point P3 may be calculated so that the length of the zone between the points P1 and P3 simply becomes twice the length of the zone between the points P1 and P2.

The lane travel limit zone determining part 216 determines a lane travel limit zone from the calculated lane route deviation point and lane change limit point. In the example in FIG. 4, a zone between the points P1 and P2 on the lane R3 and a zone between the points P1 and P3 on the lane R4 are determined as lane travel limit zones. The lane travel limit zone setting part 210 can recalculate the lane travel limit zone each time the vehicle speed is changed by a prescribed amount or more and can set a new lane travel limit zone. If a degree of congestion can be acquired for each lane, the lane travel limit zone setting part 210 may prolong the lane travel limit zone according to the degree of congestion on the lane.

The vehicle position calculating part 220 acquires the position information calculated by the position information calculating unit 110 or acquires GPS information, information output from sensors, or the like, and calculates the position of the vehicle M on the road on which the vehicle M is traveling. The traveling lane detecting part 230 detects the lane on which the vehicle M is traveling. Specifically, the traveling lane detecting part 230 analyzes, for example, a road image including a white line photographed by the imaging unit 130, and identifies the lane on which the vehicle M is traveling with reference to the lane attribute information indicated in FIG. 3. Alternatively, if lane information has been distributed from, for example, a road-side device, it is possible to use the lane information. Although there is no particular limitation on the method by which the traveling lane detecting part 230 detects a lane, the methods described in, for example, Japanese Patent No. 3891231 and Japanese Unexamined Patent Application Publication No. 2007-127598 may be used.

The guide part 240 provides a guide related to a traveling lane according to vehicle position information and/or traveling lane information before the vehicle M enters a lane travel limit zone set by the lane travel limit zone setting part 210, after the vehicle M has entered the lane travel limit zone, or when the vehicle M may enter the lane travel limit zone. The guide part 240 preferably provides a guide according to the type of an entry into the lane travel limit zone.

Figure 7A:
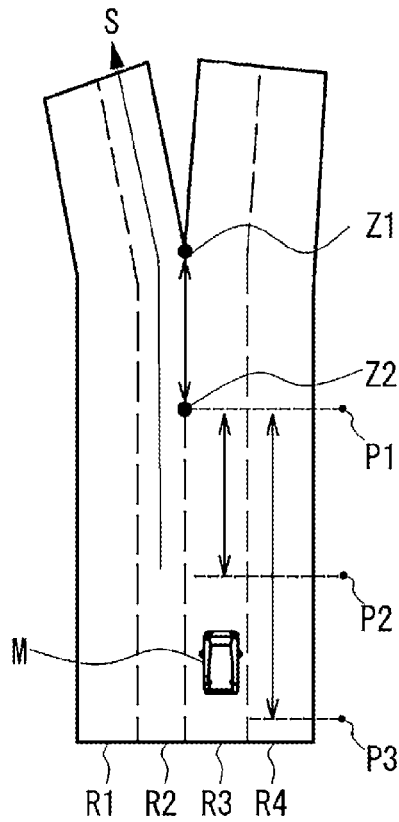
FIGS. 7A and 7B each illustrate an example of a guide, related to a traveling lane, that is provided by a guide part in the first embodiment.
Figure 7B:
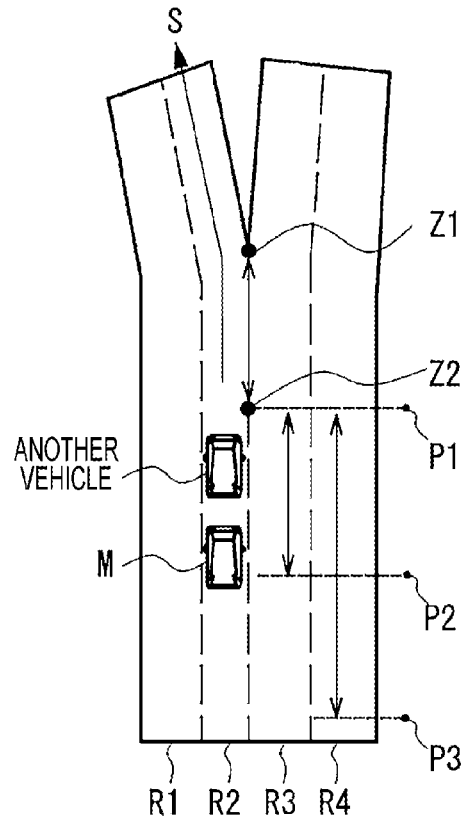

FIGS. 7A and 7B each illustrate an example of a guide provided by the guide part 240. If, as illustrated in FIG. 7A, the travel direction S of the route is a left branch (to the lane R1 or R2) and the vehicle M is traveling on the lane R3, for example, when the vehicle M is going to enter the left branch from the start point P2 of the lane travel limit zone, the guide part 240 provides a guide to prompt a lane change such as "Move to a left lane". In a situation as illustrated in FIG. 7A, when the vehicle M is going to change the current lane to the lane travel limit zone on the lane R4, the guide part 240 provides a guide such as "Maintain the current lane and then change to the lane R4". Alternatively, the guide part 240 may provide an alarm indicating that the vehicle may deviate from the route. These guides are provided in the form of characters or an image displayed on the display unit 140 or a voice output from the voice output unit 150. A decision as to whether the vehicle M is going to make a lane change can be made from, for example, direction indicator information or a change in the steering wheel angle acquired from the vehicle state detecting unit 180, a change in the distance between the vehicle M and the white line detected from the image captured by the imaging unit 130, or the like.

If, as illustrated in FIG. 7B, the vehicle M is going to enter the lane travel limit zone on the lane R3 from an intermediate point to pass another vehicle ahead of the vehicle M, the guide part 240 also provides a guide to suppress a lane change such as "Maintain the current lane". This guide is an alarm to prevent a situation in which if the vehicle M enters the lane travel limit zone on the lane R3 as a result of the passing, the vehicle M could not return to the lane R2 because of the lane change prohibited zone.

In a preferred aspect, the guide part 240 provides a guide a certain distance, or a certain time before, the vehicle M enters a lane travel limit zone. The position of the vehicle M on the road is calculated by the vehicle position calculating part 220 and the lane on which the vehicle M is traveling is detected by the traveling lane detecting part 230 at appropriate times, so the guide part 240 can accurately calculate a certain distance or a certain time before the vehicle M reaches the point P2 or P3. If there is a sign that the vehicle M is going to make a lane change before the vehicle M actually makes a lane change, the guide part 240 may provide an alarm. If, for example, the possibility of the vehicle M entering a lane travel limit zone from an intermediate point is inferred by acquiring direction indicator information, the guide part 240 may provide an alarm accordingly. In the example in FIG. 7B, if direction indicator information indicating the right direction is acquired, the guide part 240 provides an alarm.

Figure 8:
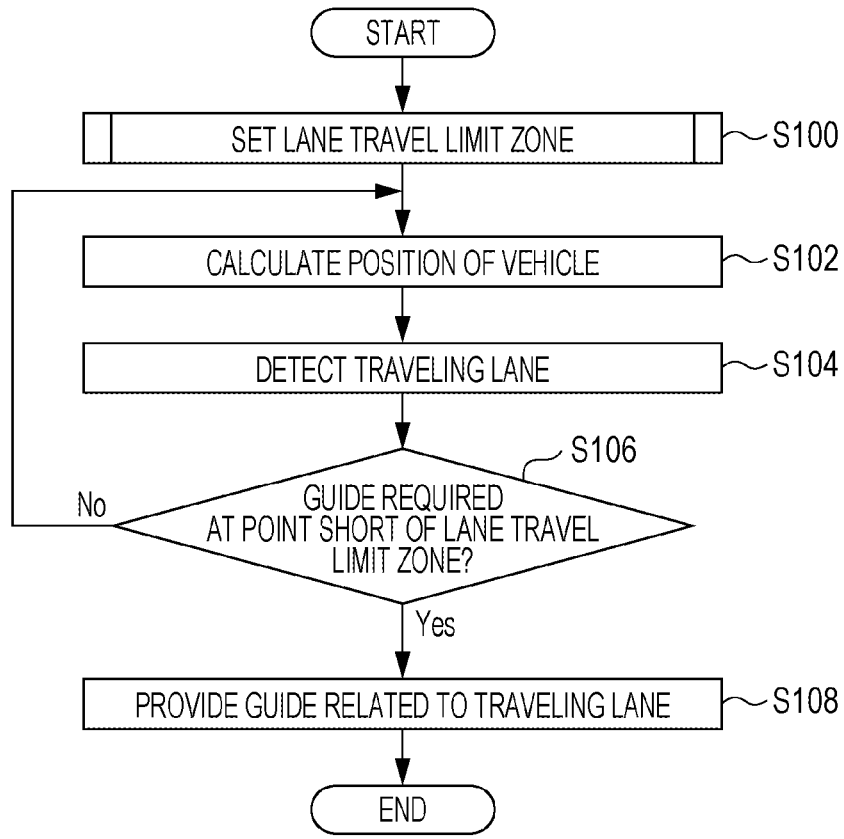
FIG. 8 is a flowchart illustrating part of the operation of the guide program in the first embodiment.

FIG. 8 is a flowchart illustrating a guide operation related to a traveling lane in this embodiment. The guide program 200 is executed when, for example, a route searched for by the navigation unit 120 is guided, a route on which to travel is set by another method (such as Green Wave), or the vehicle M is simply traveling on the main road. In this example, it will be assumed that the vehicle M is going to branch from the main road to a left lane (lane R1 or R2) as illustrated in FIG. 4.

Figure 9:
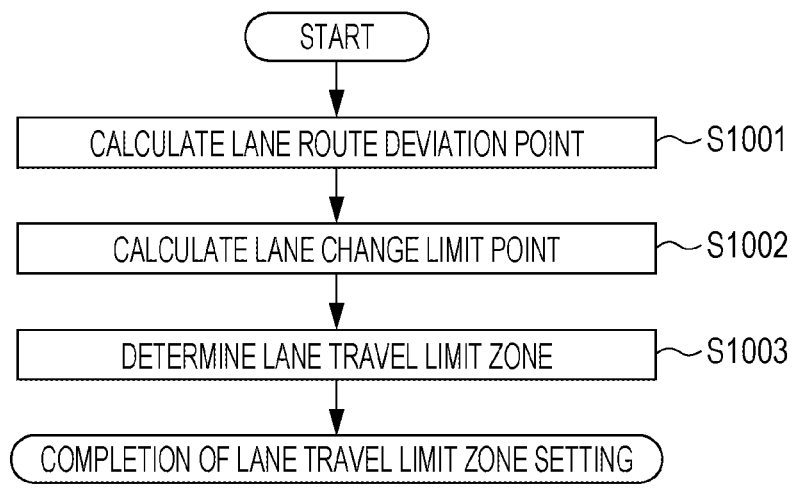
FIG. 9 is a flowchart illustrating an operation to set a lane travel limit zone in the first embodiment.

First, the guide program 200 causes the lane travel limit zone setting part 210 to set a lane travel limit zone (S100). FIG. 9 is a flowchart illustrating an operation to set a lane travel limit zone in the first embodiment. The setting of a lane travel limit zone begins with the calculation of a lane route deviation point by the lane route deviation point calculating part 212 (S1001). The lane travel limit zone setting part 210 references the link data, node data and other data of the road on which the vehicle M is traveling and calculates the point P1 as the lane route deviation point on the basis of the prohibited zone end point Z2. Then, the lane change limit point calculating part 214 calculates the lane change limit point (point P2 or P3) (S1002), after which the lane travel limit zone determining part 216 sets a lane travel limit zone for the lane from which the vehicle M is forced to make a lane change, according to the points calculated in S1001 and S1002 (S1003). Upon the completion of step S1003, the setting of the lane travel limit zone is completed. The information that has been set is retained until the vehicle M passes the lane travel limit zone. After the vehicle M has passed the lane travel limit zone, a next lane travel limit zone is set.

Next, the vehicle position calculating part 220 calculates the position of the vehicle M on the road on which the vehicle M is traveling (S102) and the traveling lane detecting part 230 detects the lane on which the vehicle M is traveling (S104). On the basis of the position of the vehicle M and the lane on which the vehicle M is traveling, the guide part 240 decides whether the vehicle M has reached a position a certain distance short of the lane travel limit zone or a certain time before the vehicle M enters a lane travel limit zone has come, that is, whether the current time is a time to provide a guide (S106). If the vehicle M has reached that position or the certain time has come, the guide part 240 provides a guide related to the traveling lane as illustrated in FIG. 7A or 7B (S108). Although, in the flowchart in FIG. 8, processing is terminated at S108, if a route to the destination has been searched for, lane travel limit zones are appropriately set until the destination is reached. Each time a lane travel limit zone is set, a guide related to the traveling lane is provided. If the vehicle speed is changed by a prescribed amount or more and the lane travel limit zone is recalculated accordingly, a guide for a lane change is provided after the lane travel limit zone has been recalculated. Even if the vehicle M is guided to travel in the recalculated lane travel limit zone, since the lane change limit point has been exceeded, a guide to suppress or inhibit a lane change may be provided.

Figure 10:
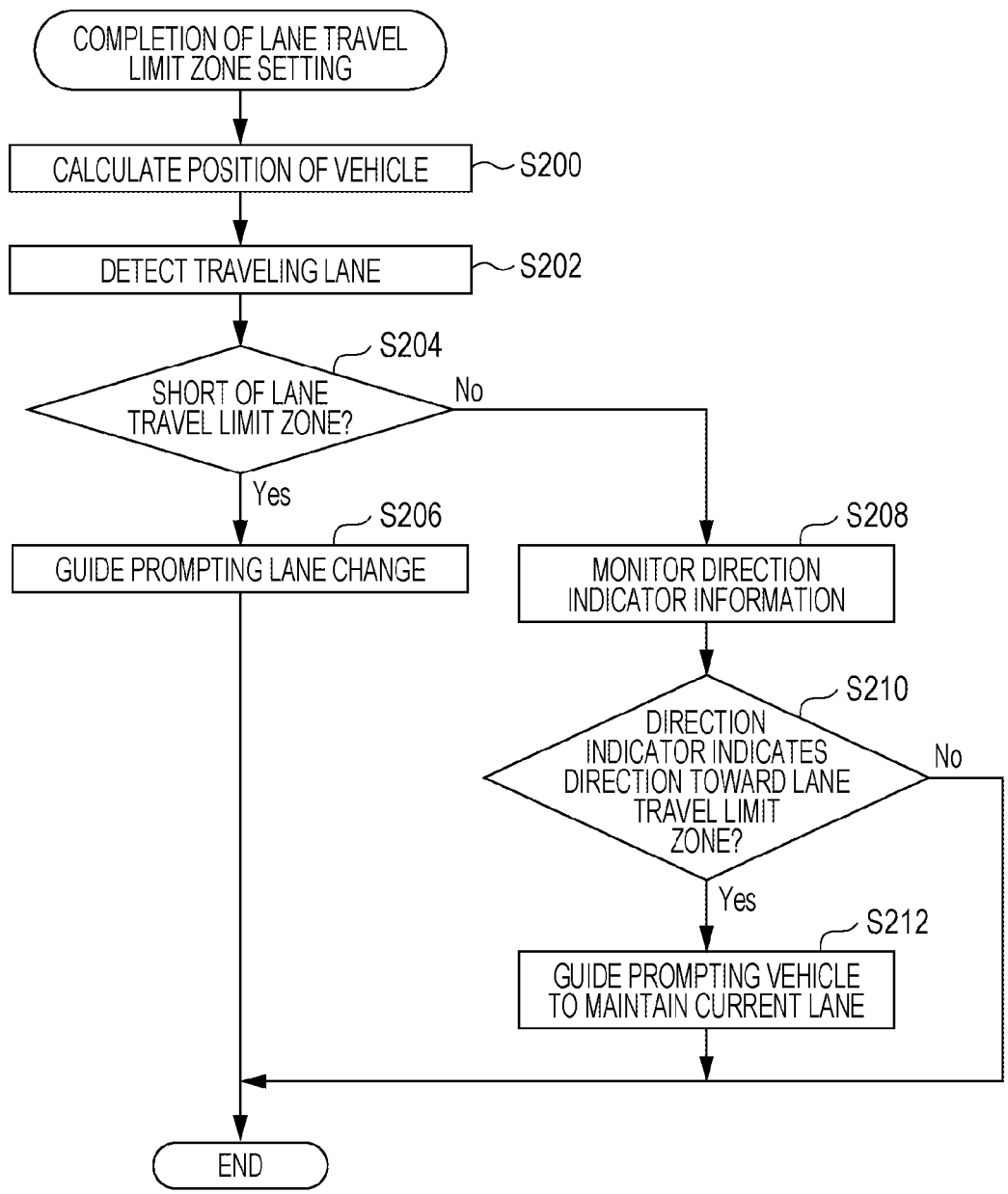
FIG. 10 is a flowchart illustrating part of the operation of the guide program in the first embodiment to provide a guide during an attempt to move to a lane on which a lane travel limit zone is set.

Next, a guide operation related to the traveling lane will be described, the guide operation involving a decision as to whether a lane change is to be made, with reference to the flowchart in FIG. 10. It will be assumed here that direction indicator information is used to decide whether a lane change is to be made.

After a lane travel limit zone has been set, the vehicle position calculating part 220 calculates the position of the vehicle M on the road on which the vehicle M is traveling (S200) and the traveling lane detecting part 230 detects the lane on which the vehicle M is traveling (S202). According to the calculated position and detected lane, the guide part 240 decides whether the vehicle M is going to enter a lane travel limit zone from a point short of a lane travel limit zone set on the lane on which the vehicle M is traveling (S204). If the guide part 240 decides that the vehicle M is going to enter the lane travel limit zone from a point short of the lane travel limit zone on which the vehicle M is traveling, the guide part 240 provides a guide that prompts a lane change as illustrated in FIG. 7A (S206). If the result in S204 is No, that is, the vehicle M has entered the lane travel limit zone, the guide part 240 monitors direction indicator information acquired by the vehicle state detecting unit 180 (S208) and decides whether the vehicle M is going to enter the lane travel limit zone from an intermediate point according to the direction indicator information (S210). If the direction indicated by the direction indicator is toward the lane on which the lane travel limit zone is set, the guide part 240 decides that the vehicle M is going to enter the lane travel limit zone and provides a guide that prompts the vehicle M to maintain the current lane as illustrated in FIG. 7B (S212).

Figure 11:
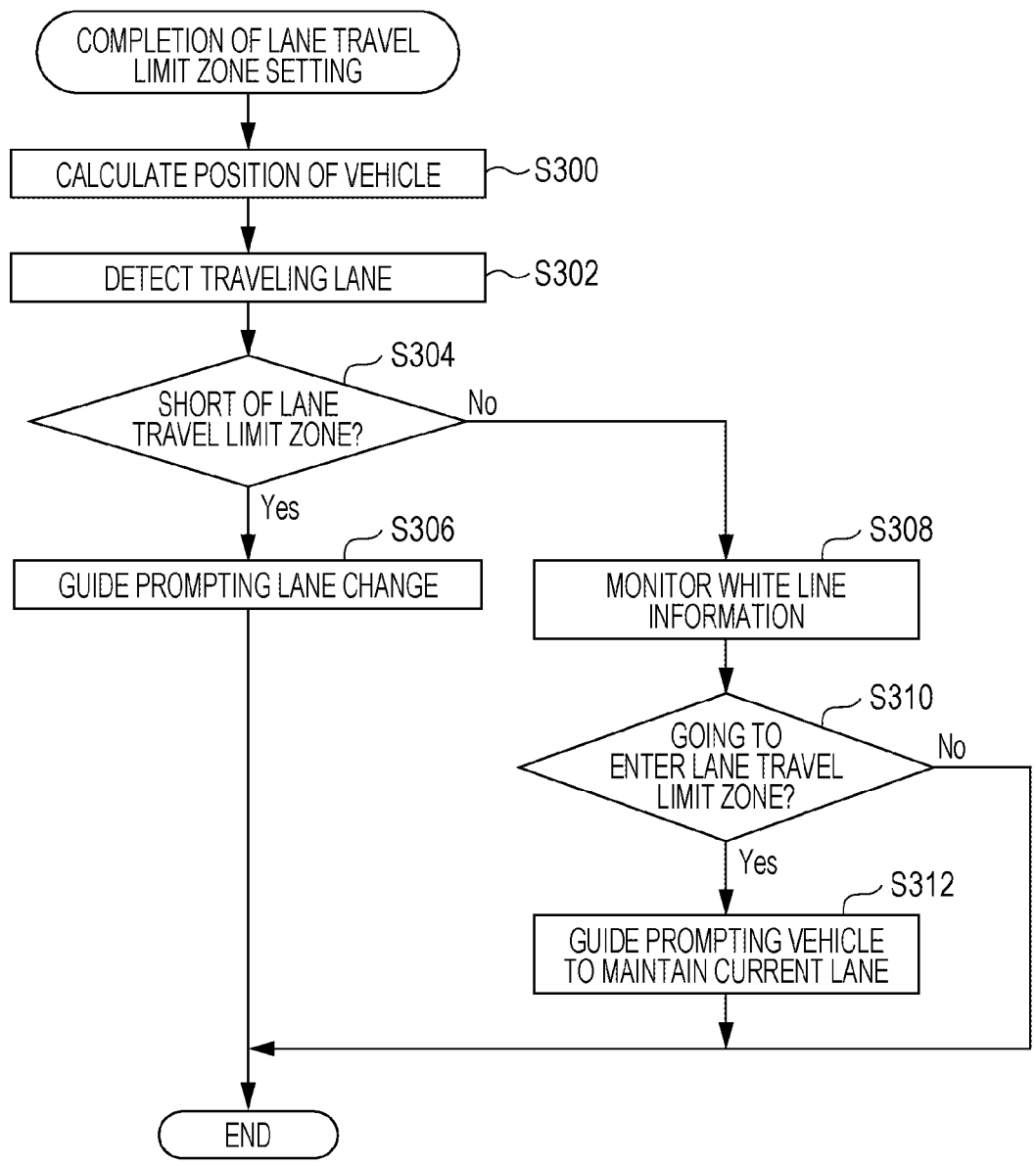
FIG. 11 is a flowchart illustrating part of the operation of the guide program in the first embodiment to provide a guide during an attempt to move to a lane on which a lane travel limit zone is set.

FIG. 11 is a flowchart that illustrates a guide operation performed when whether a lane change is to be made is decided according to a result in the detection of a white line photographed by the imaging unit 130. Steps S300 to S306 are the same as steps S200 to S206 in FIG. 10, so their description will be omitted. If the vehicle M is not short of a lane travel limit zone, that is, the vehicle M has entered the zone, the guide part 240 monitors white line information detected from the result of analyzing an image captured by the imaging unit 130 (S308) and decides whether the vehicle M is going to enter a lane travel limit zone from an intermediate point, according to the white line information (S310). If the vehicle M is approaching the white line of the lane on which the lane travel limit zone is set (that is, the distance to the white line is being reduced) or the vehicle M is going to travel beyond the white line and to enter the lane travel limit zone, the guide part 240 provides a guide that prompts the vehicle M to maintain the current lane as illustrated in FIG. 7B (S312). If, for example, a distance between the position of the white line and the position of the vehicle falls to or below a certain distance, a guide in S312 is provided.

The first embodiment is related to a guide that is provided when the vehicle M travels on a route or branches in the travel direction. By setting a lane travel limit zone for a lane from which the vehicle M is forced to make a lane change, it is possible to provide a guide to prompt the vehicle M to make a lane change short of the lane travel limit zone. It is also possible to provide a guide to suppress the vehicle M from entering the lane travel limit zone.

Next, a second embodiment of the present invention will be described in detail with reference to the drawings. Although the first embodiment has related to a guide provided when the vehicle M is going to travel on a branch lane, the second embodiment relates to a guide provided when the vehicle M is traveling on a road on which a restricted lane zone is set.

The lane travel limit zone setting part 210 in the second embodiment sets a lane travel limit zone according to position information about a restricted lane zone. The restricted lane zone corresponds to the lane change prohibited zone described in the first embodiment. The lane travel limit zone setting part 210 sets a lane travel limit zone at an end of a restricted lane zone defined by a restricted lane zone start point and a restricted lane zone end point, instead of the prohibited zone start point and prohibited zone end point in the first embodiment. A restricted lane zone is generated due to an accident, road construction, congestion, or another factor. Lane restriction information due to these factors is acquired from, for example, the road traffic information distribution site 166 (see FIG. 2) that distributes road traffic information in real time or from a road-side device. Lane restriction information can include identification information that identifies a lane on which a lane restriction is imposed, position information that indicates a start point and an end point between which the lane restriction is imposed, and road information (link information) that indicates a road on which the lane restriction is imposed. According to the lane restriction information, the lane travel limit zone setting part 210 decides whether there is a lane restriction in the travel direction on the road on which the vehicle M is traveling. If there is a lane restriction, the lane travel limit zone setting part 210 sets a lane travel limit zone as in the first embodiment.

Figure 12:
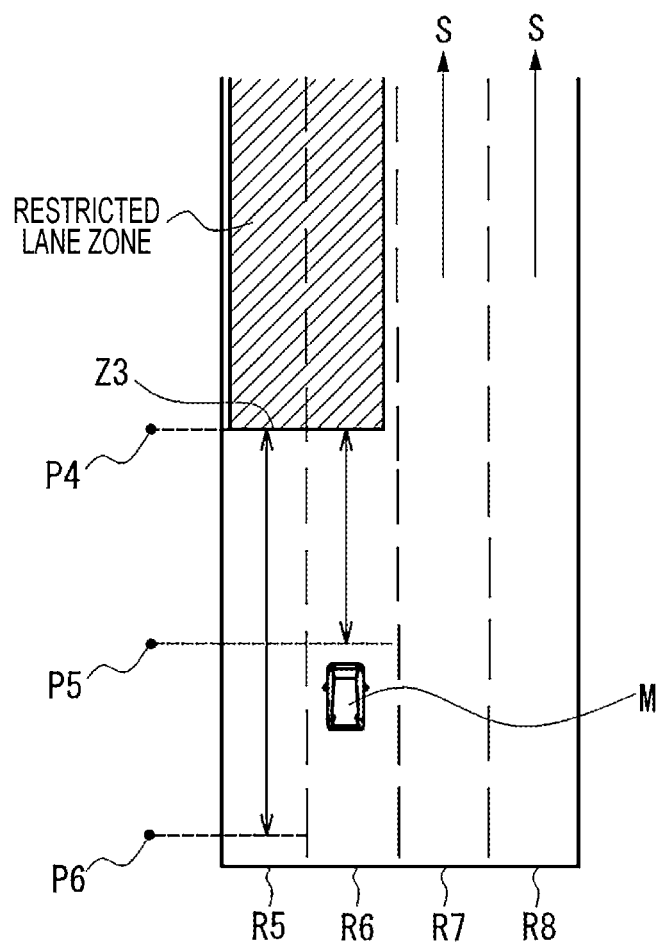
FIG. 12 illustrates an example of a lane travel limit zone, which is set on a road that includes a restricted lane zone in a second embodiment of the present invention.

FIG. 12 illustrates an example of setting a lane travel limit zone when a lane restriction is imposed. In this example, a lane restriction is imposed on the lanes R5 and R6 in the travel direction that is the same as the travel direction on a route S1; while the vehicle M is traveling on the lane R5 or R6, the vehicle M is forced to change to the lane R7 or R8. In the drawing, a hatched zone is a restricted lane zone, the start point of which is denoted Z3. The lane route deviation point calculating part 212 calculates the point P4, which matches the start point Z3 of the restricted lane zone, as the lane route deviation point. As in the first embodiment, the lane change limit point calculating part 214 calculates limit points P5 and P6 as the lane change limit points, according to vehicle speed information, a time required to make a lane change, and other information, the limit points P5 and P6 being used to have the vehicle M complete a lane change before a lane route deviation point is reached. The lane travel limit zone determining part 216 sets, as a lane travel limit zone, a zone between the calculated lane route deviation point and the calculated lane change limit point.

Figure 13A:
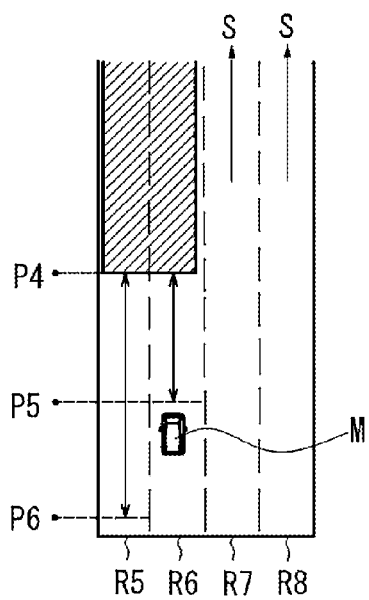
FIGS. 13A and 13B each illustrate an example of a guide, related to a traveling lane, that is provided by a guide part in the second embodiment.
Figure 13B:
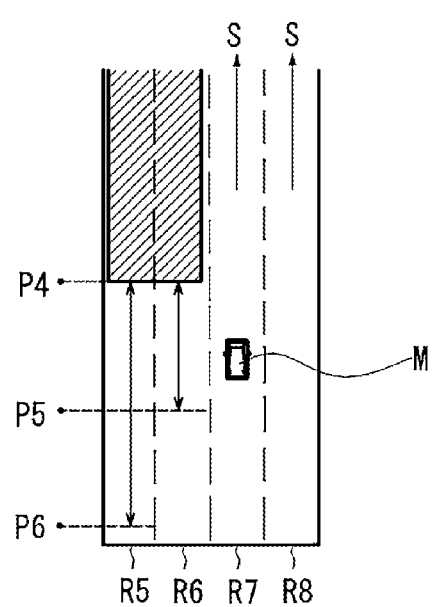

FIGS. 13A and 13B illustrate examples of guides in the second embodiment. If the vehicle M reaches a certain distance short of a lane travel limit zone while traveling on the lane R6 as illustrated in FIG. 13A, the guide part 240 provides the guide "Move to a right lane". If the vehicle M is traveling on the lane R7 or R8, the vehicle M does not need to make a lane change, in which case the guide part 240 does not provide a guide. If the vehicle M attempts to change to the lane R6, on which a lane travel limit zone is set, while traveling on the lane R7 as illustrated in FIG. 13B, the guide part 240 provides the guide "Maintain the current lane".

As described above, the second embodiment differs from the first embodiment only in the lane change prohibited zone in the first embodiment. In the second embodiment, a lane travel limit zone can be set by using the same logic as in the first embodiment and a guide can be provided for the traveling lane. The present disclosure is not limited to the road environments indicated in the first and second embodiments. The present disclosure can also be practiced at a traffic intersection including a lane change prohibited zone and on a road on which the number of lanes is reduced. In these cases as well, when a lane route deviation point is calculated on the basis of a zone in which a lane change is prohibited or must not be made to suit the relevant road environment and a lane travel limit zone is set on the basis of the lane route deviation point, it becomes possible to perform common guide processing related to the traveling lane.

Next, a third embodiment of the present disclosure will be described with reference to the drawings. In the first and second embodiments, the vehicle-mounted apparatus 10 has calculated and set a lane travel limit zone and has performed other processing on the lane travel limit zone. In the third embodiment, however, an example will be described in which an external server and the vehicle-mounted apparatus 10 cooperate as a guide system to provide a guide related to a lane change. The vehicle-mounted apparatus 10 and the guide program 200 in it in the third embodiment can include the functions, structures, and the like described in the first and second embodiments.

Figure 14:
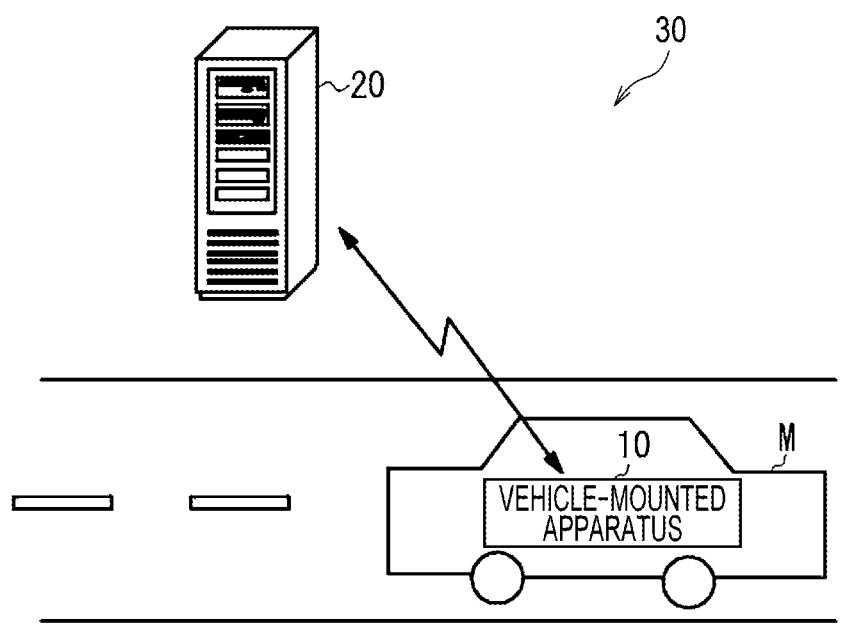
FIG. 14 illustrates the structure of a guide system in a third embodiment of the present invention.

FIG. 14 illustrates the structure of a guide system 30 in the third embodiment. The guide system 30 in the third embodiment includes the vehicle-mounted apparatus 10 and a server 20. The vehicle-mounted apparatus 10 transmits data to and receives data from the server 20 in wireless communication, through a wireless network, or in another method.

Figure 15:
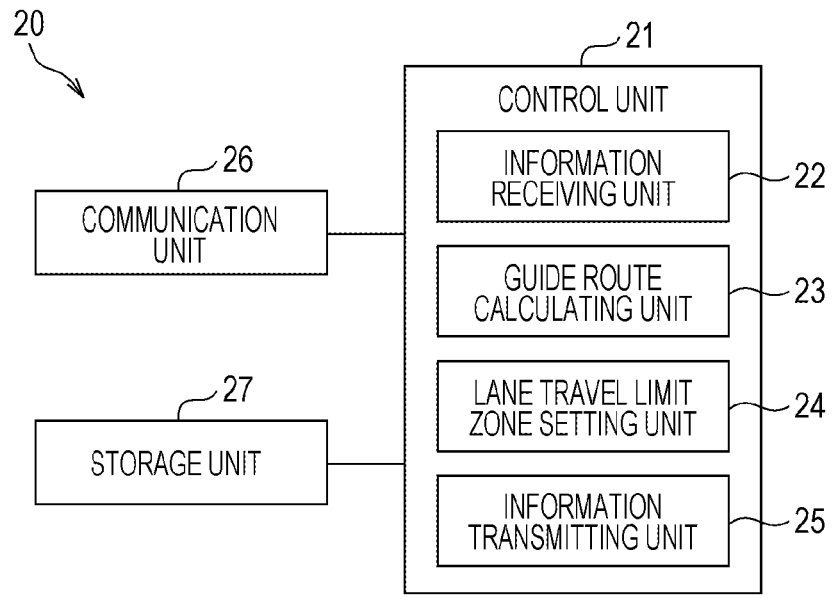
FIG. 15 illustrates the structure of a server in the third embodiment.

FIG. 15 illustrates the structure of the server 20 in the third embodiment. The server 20 in the third embodiment includes a control unit 21, which controls individual units, a communication unit 26, which enables wireless communication to and from the vehicle-mounted apparatus 10, application software and programs executed by the control unit 21, and a storage unit 27, which stores map data and other data described in the first embodiment and so on.

The control unit 21 in the third embodiment further includes an information receiving unit 22, which receives information from the vehicle-mounted apparatus 10 through the communication unit 26, a guided route calculating unit 23, which calculates a guided route on the basis of information received from the vehicle-mounted apparatus 10, a lane travel limit zone setting unit 24, which a sets a lane travel limit zone, and an information transmitting unit 25, which transmits information to the vehicle-mounted apparatus 10.

The information receiving unit 22 receives at least vehicle position information about the vehicle M from the vehicle-mounted apparatus 10. The information receiving unit 22 may further receive destination information or travel information about the vehicle M (such as, for example, vehicle speed information, direction indicator information, and other information) from the vehicle-mounted apparatus 10. The guided route calculating unit 23 uses map data stored in the storage unit 27 to calculate a guided route from the vehicle position information and/or destination information received by the information receiving unit 22. Calculation of the guided route is a function that has been undertaken by the navigation unit 120 in the first and second embodiments. Destination information does not necessarily indicate a specific destination, but may indicate the road on which the vehicle is traveling (road of the same road type or the main road, for example) as a virtual destination.

The lane travel limit zone setting unit 24 sets a lane travel limit zone according to the guided route calculated by the guided route calculating unit 23. The function of the lane travel limit zone setting unit 24 is equivalent to the function of the lane travel limit zone setting part 210. If speed information about the vehicle M cannot be obtained in real time, however, the lane travel limit zone setting unit 24 may calculate a lane change limit point on the basis of the restricted speed set for a link in the map data and may set a lane travel limit zone accordingly. The information transmitting unit 25 transmits the guided route calculated by the guided route calculating unit 23 and the lane travel limit zone calculated by the lane travel limit zone setting unit 24 to the vehicle-mounted apparatus 10.

Figure 16:
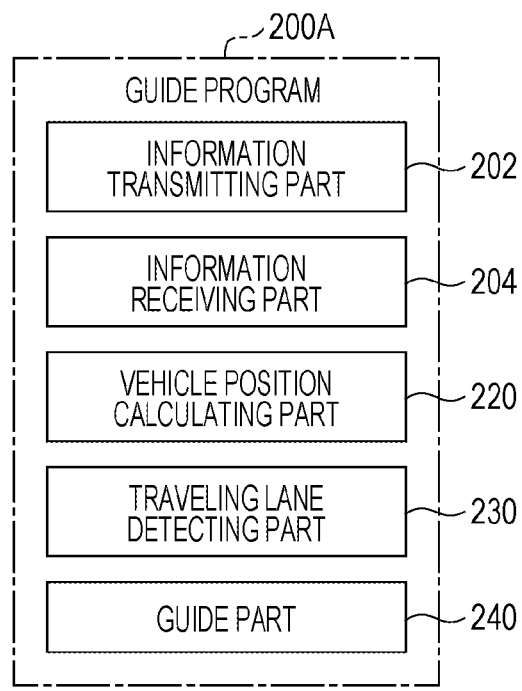
FIG. 16 illustrates an example of the functional structure of a guide program in the third embodiment.

FIG. 16 illustrates the functional structure of a guide program 200A in the third embodiment. The guide program 200A in the third embodiment includes an information transmitting part 202, which transmits at least vehicle position information about the vehicle M to the server 20 through the communication unit 160, and an information receiving part 204, which receives at least the guided route and lane travel limit zone information provided by the server 20, besides the vehicle position calculating part 220, traveling lane detecting part 230, and guide part 240 described in the first and second embodiments. Since, in the third embodiment, the server 20 undertakes the lane travel limit zone setting function and guided route calculating function, the guide program 200A does not necessarily include the lane travel limit zone setting part 210.

Figure 17:
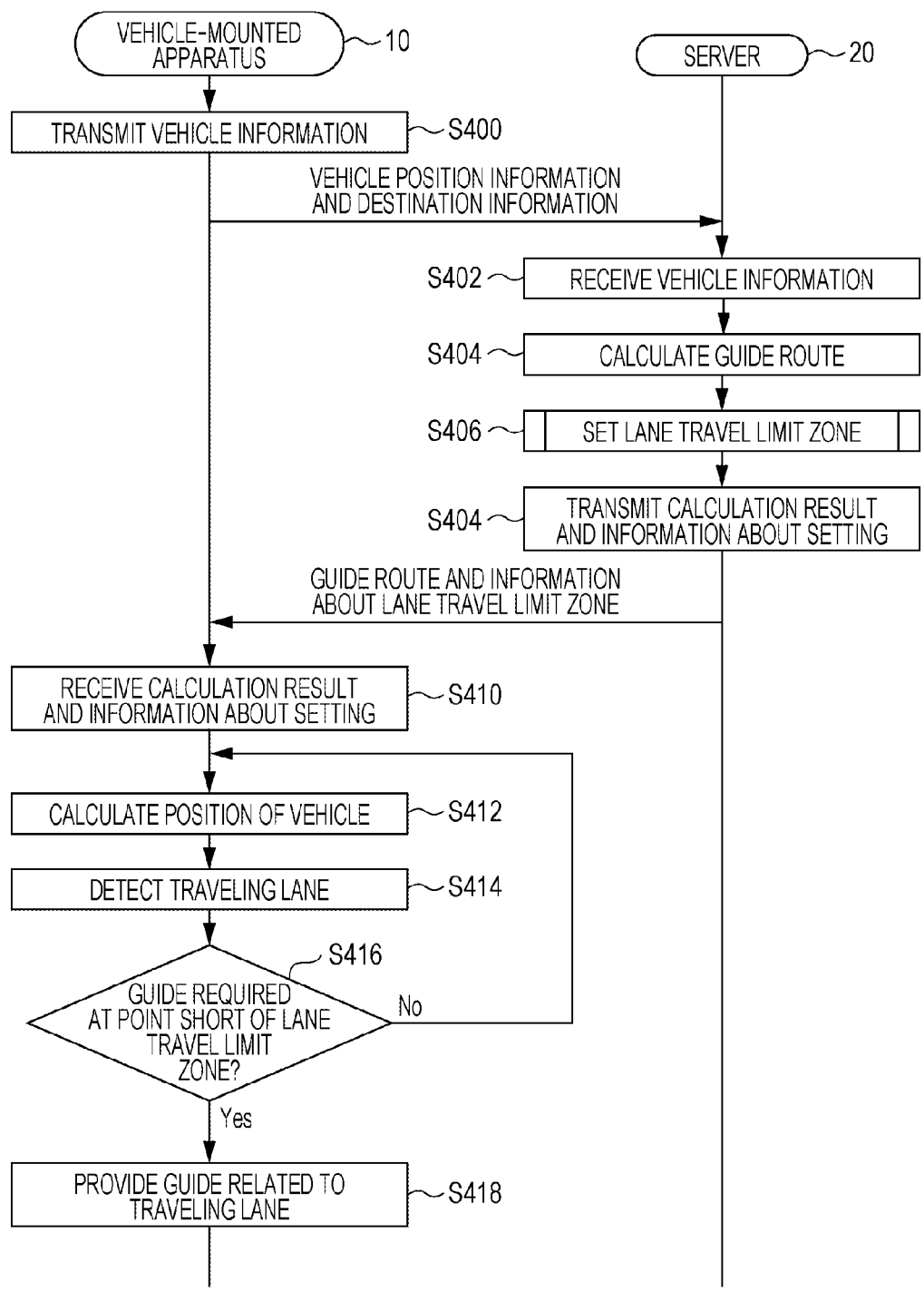
FIG. 17 is a flowchart illustrating the operation of the guide system in the third embodiment.
Figure 18A:
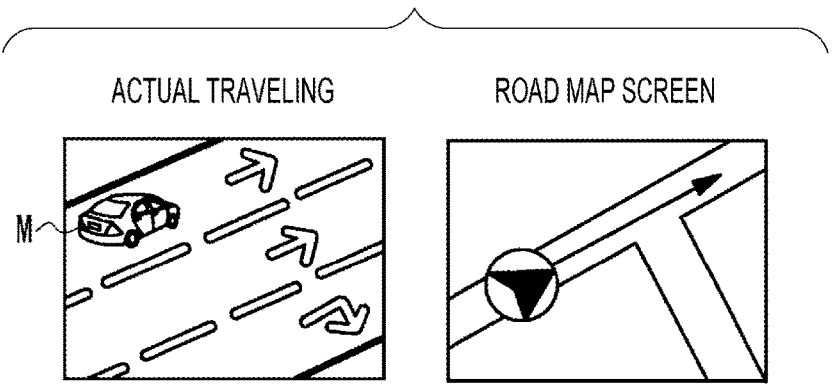
FIGS. 18A and 18B illustrate a conventional vehicle-mounted apparatus.
Figure 18B:
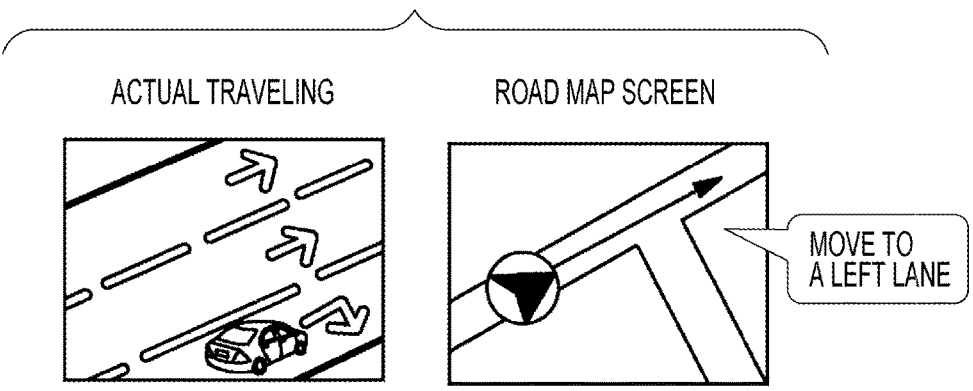

FIG. 17 is a flowchart illustrating the operation of the guide system 30 in the third embodiment. In the guide system 30 in the third embodiment, the information transmitting part 202 first transmits vehicle information that includes at least vehicle position information and destination information to the server 20 (S400). In the server 20, the information receiving unit 22 receives the vehicle information (S402) and the guided route calculating unit 23 calculates a guided route from the vehicle information received in S402 (S404). Then, the lane travel limit zone setting unit 24 sets a lane travel limit zone according to the functions illustrated in FIG. 6 and the flow illustrated in FIG. 9 (S406). The information transmitting unit 25 transmits the guided route calculated in S404 and information about the lane travel limit zone set in S406 to the vehicle-mounted apparatus 10 (S408). The information receiving part 204 receives the information transmitted in S408 (S410). In the first embodiment, the vehicle-mounted apparatus 10 has set a lane travel limit zone and has calculated a guided route and the like. In the third embodiment, however, a setting and a calculation result are received from the server 20 in S410. Descriptions of processing in S412 to S418 will be omitted because the processing is the same as processing in S102 to S108.

As described above, in the third embodiment, the vehicle-mounted apparatus 10 and server 20 cooperate to create a guide system, so the setting of a lane travel limit zone and other operations can be centralized in the server 20. Therefore, an appropriate traveling lane can be guided without having to mount a function to set a lane travel limit zone and other functions in individual vehicle-mounted apparatuses.

So far, embodiments and implementations of the present disclosure have been described in detail, but the present disclosure is not limited to particular embodiments. Various variations and changes are possible without departing from the intended scope of the present disclosure described in the claims.

It is therefore intended that the foregoing detailed description be regarded as illustrative rather than limiting, and that it be understood that it is the following claims, including all equivalents, that are intended to define the spirit and scope of this disclosure.

What is claimed is:

1. An electronic apparatus comprising:
 a memory; and
 a controller configured to execute instructions stored in the memory and configured to:
  set, for each lane, a lane travel limit zone in which a lane change to a route is restricted;
  calculate a position of a vehicle of interest;
  detect a traveling lane on which the vehicle is traveling;
  provide a guide concerning the traveling lane according to the traveling lane and the position of the vehicle and calculate the position before the vehicle enters the lane travel limit zone; and
  determine whether the vehicle is going to make a lane change;
 wherein when the controller determines that the vehicle is going to make a lane change from an intermediate point in a lane travel limit zone on the traveling lane to a lane travel limit zone on another lane, the controller is configured to provide a guide that prompts the vehicle to maintain the traveling lane.

2. The electronic apparatus according to claim 1, wherein the controller is further configured to set a zone between a deviation point from which a deviation from the route occurs and a limit point up to which a lane change to the route is possible, the limit point being short of the deviation point, as the lane travel limit zone.

3. The electronic apparatus according to claim 2, wherein the deviation point is an end of a lane change prohibited zone on a road having a branch.

4. The electronic apparatus according to claim 2, wherein the deviation point is an end of a restricted lane zone.

5. The electronic apparatus according to claim 2, wherein the deviation point is an end of a lane to be eliminated in a lane reduction portion.

6. The electronic apparatus according to claim 1, wherein when the vehicle is traveling on a road having a plurality of lanes, the controller is further configured to set one lane travel limit zone for each lane.

7. The electronic apparatus according to claim 6, wherein the controller is further configured to:
set a first lane travel limit zone on a first lane close to a lane on which the vehicle is allowed to travel in a route direction without making a lane change, and
set a second lane travel limit zone, which is longer than the first lane travel limit zone, on a second lane, which is further away from the lane on which the vehicle is allowed to travel in the route direction without making a lane change than the first lane.

8. The electronic apparatus according to claim 1, wherein the controller is further configured to provide a guide that prompts a lane change to the route when the vehicle may enter a lane travel limit zone on another lane from a point short of a lane travel limit zone on the traveling lane.

9. The electronic apparatus according to claim 1, wherein the controller is further configured to detect a white line on a road surface; and
wherein when the vehicle approaches or has crossed a white line, the controller is further configured to decide that the vehicle has made a lane change.

10. The electronic apparatus according to claim 1, wherein the controller is further configured to calculate a guided route to a destination,
wherein the route is a guided route that the guided route calculating unit is configured to calculate.

11. An electronic apparatus comprising:
a memory; and
a controller configured to execute instructions stored in the memory and configured to:
communicate with a server apparatus;
receive, from the server apparatus, a route to a destination and a lane travel limit zone that is set for each lane and in which a lane change to the route is restricted;
calculate a position of a vehicle of interest;
detect a traveling lane on which the vehicle is traveling; and
provide a guide concerning the traveling lane according to the position of the vehicle and the traveling lane before the vehicle enters the lane travel limit zone; and
determine whether the vehicle is going to make a lane change;
wherein when the controller determines that the vehicle is going to make a lane change from an intermediate point in a lane travel limit zone on the traveling lane to a lane travel limit zone on another lane, the controller is configured to provide a guide that prompts the vehicle to maintain the traveling lane.

12. A guide method executed in an electronic apparatus comprising a controller, the method comprising:
a setting step of setting a lane travel limit zone, in which a lane change to a route must not be started, for each lane;
a vehicle position calculating step of calculating a position of a vehicle of interest;
a detecting step of detecting a traveling lane on which the vehicle is traveling;
a guiding step of providing a guide concerning the traveling lane according to the calculated position of the vehicle and the detected traveling lane before the vehicle enters the lane travel limit zone;
a determination step of determining whether the vehicle is going to make a lane change; and
a second guiding step of providing a guide that prompts the vehicle to maintain the traveling lane when it is determined that the vehicle is going to make a lane change from an intermediate point in a lane travel limit zone on the traveling lane to a lane travel limit zone on another lane.

13. A guide system comprising:
a server comprising:
a memory; and
a controller configured to execute instructions stored in the memory and to:
receive a position of a vehicle of interest and a destination from an electronic apparatus mounted in the vehicle,
calculate a route according to the position of the vehicle and the destination,
set a lane travel limit zone, in which a lane change to the route is restricted, for each lane, and
transmit the route and the lane travel limit zone to the electronic apparatus mounted in the vehicle; and
the electronic apparatus mounted in the vehicle comprising:
a memory; and
a controller configured to execute instructions stored in the memory and configured to:
calculate the position of the vehicle,
detect a traveling lane on which the vehicle is traveling,
receive the route and the lane travel limit zone from the server apparatus,
provide a guide concerning the traveling lane according to the position of the vehicle and the traveling lane before the vehicle enters the lane travel limit zone; and
determine whether the vehicle is going to make a lane change;
wherein when the controller determines that the vehicle is going to make a lane change from an intermediate point in a lane travel limit zone on the traveling lane to a lane travel limit zone on another lane, the controller is configured to provide a guide that prompts the vehicle to maintain the traveling lane.

* * * * *